June 30, 1925.

J. N. ABBOTT 1,543,971

TIRE FOR MINE LOCOMOTIVE WHEELS

Filed April 13, 1925

Inventor
J. N. Abbott

By F. A. Witherspoon
Attorney

Patented June 30, 1925.

1,543,971

UNITED STATES PATENT OFFICE.

JAMES N. ABBOTT, OF CHRISTOPHER, KENTUCKY.

TIRE FOR MINE-LOCOMOTIVE WHEELS.

Application filed April 13, 1925. Serial No. 22,893.

*To all whom it may concern:*

Be it known that I, JAMES N. ABBOTT, a citizen of the United States, residing at Christopher, in the county of Perry and State of Kentucky, have invented certain new and useful Improvements in Tires for Mine-Locomotive Wheels; and I do hereby declare the following to be a full, clear, and exact description of the invention, such as will enable others skilled in the art to which it appertains to make and use the same.

This invention relates to wheels for mine locomotives and has for its object to provide a construction less costly to maintain and more efficient in use than those heretofore proposed.

With these and other objects in view the invention consists in the novel details of construction and combinations of parts as will be more fully hereinafter disclosed and particularly pointed out in the claim.

Referring to the drawings forming a part of this specification in which like numerals designate like parts in all the views.

Heretofore great difficulty, as well as expense has been incurred in the maintenance of the wheels of mine locomotives and cars. This has been due to the fact that the mine road-bed has not been well graded nor ballasted, thereby producing a poor foundation for the rails. Constant and heavy usage has, as a result, caused the wheels, or the tread portions thereof, to become appreciably worn in transit over the said rails. The degree of this wear of course has been dependent upon several factors which are well known and therefore need not here be mentioned, but even with the best of care the retreading of wheels for mine cars and locomotives has been a frequent and costly operation. This invention, on the other hand, constitutes a remedy in that it reduces materially the cost of retreading wheels.

Figure 4:
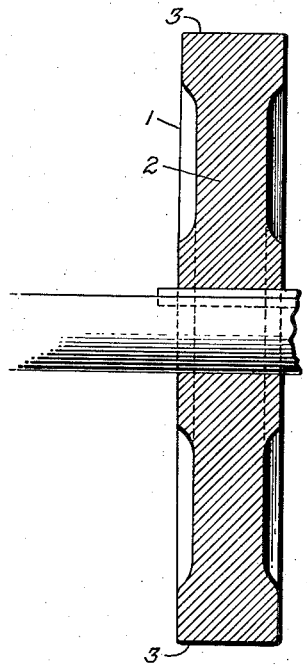
Figure 4 is a sectional view of a wheel blank ready to receive the tire.

The wheel blank as received from the foundry is represented at 1 and from Fig. 4 will be seen to comprise the web portion 2 and the rim 3 which is suitably turned to a predetermined diameter. The tire member 4 comprises the annular portion 5 provided with an inner surface 6 turned or machined to a predetermined diameter substantially equal to the diameter of the rim 3. A flange 7 is formed at one end of the base 5 and extends at right angles thereto for a purpose which will presently be disclosed. Likewise, the outer surface 8 of the base 5 is turned to a predetermined diameter substantially equal to the diameter of the turned inner surface 10 of the annular tread portion 11 the outer surface 12 of which is likewise turned concentric with the surfaces 10, 8, 6 and 3.

Figure 1:
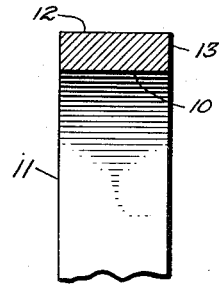
Figure 1 is a detail sectional view of the tread portion of this invention.
Figure 2:
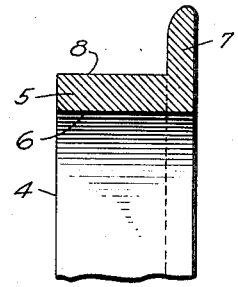
Figure 2 is a detail sectional view of the tire portion used in this invention.
Figure 3:
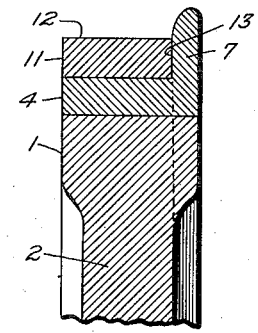
Figure 3 is a detail sectional view showing the application of the tire and tread portions to the rim of the wheel base.
Figure 5:
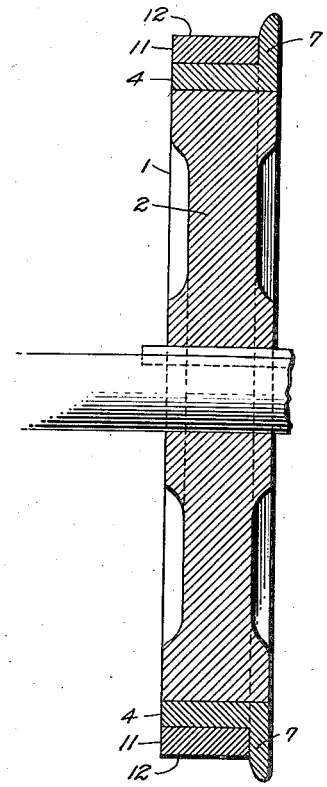
Figure 5 is a sectional view of the assembled wheel.

The tire portion 4 is slightly heated in order to expand the same, and then applied to the rim 3 of the wheel blank so that upon cooling it will be shrunk onto the wheel base 1 as clearly indicated in the drawings. After this step of the operation has been performed and the tire member has cooled, the tread member 11 is heated and then applied to the external surface 8 of the tire portion 4 so that one end 13 thereof will abut the inner wall of the flange 7 of said tire member. The tread portion is then allowed to cool and shrink in place whereupon as well understood, the frictional engagement will be sufficient to secure the tread and tire to the wheel base 1. The assembly will be as shown in Figs. 3 and 5.

The construction above disclosed will permit the use of a soft iron wheel base 1, a medium hardened tire portion 4 and a tread portion 11 of any degree of hardness desired. That is to say, the needs of each mine will determine the degree of hardness of the tread member, and therefore said tread member may be constructed of the particular quality of steel to meet said needs as well as hardened in any suitable manner to further meet said needs.

Upon long and continued use of a wheel constructed in accordance with the above disclosure the surface 12 of the tread portion 11 may become much worn and even take on what are termed flats, but the entire wheel need not be thrown away nor subjected to the expense of machining in order to recondition the same for future service. All that needs to be done is to heat the wheel, remove the worn tread portion 11 and substitute a new tread. By this means it will therefore be seen that the wheel of mine locomotives and cars can be kept more nearly standard in size than has heretofore been possible. This is apparent from the above disclosure and it will be obvious that the maximum wear of any wheel will be the thickness of the tread portion 11.

It is obvious that those skilled in the art may vary the details of construction as well as the arrangements of parts without departing from the spirit of the invention and therefore it is not desired to be limited to the foregoing except as may be required by the claim.

What is claimed is:

In a wheel for mine locomotives the combination of a wheel base of soft iron of a comparatively soft degree having a rim of a predetermined diameter and extending from side to side of said base; a metal tire portion of medium hardness, having an external surface of a predetermined diameter and an internal surface also extending from side to side of said base and of a diameter to frictionally engage said rim when shrunk thereon; an annular hardened steel tread portion having a surface of a predetermined internal diameter to frictionally engage the external surface of said tire portion when shrunk thereon; and means integral with said tire portion to position said tread portion thereon and form the flange of the assembled wheel.

In testimony whereof I affix my signature.

JAMES N. ABBOTT.